(12) United States Patent
Gagner

(10) Patent No.: US 7,117,069 B2
(45) Date of Patent: Oct. 3, 2006

(54) APPARATUS AND METHOD FOR EXECUTING BLOCK PROGRAMS

(75) Inventor: Mark Gagner, West Chicago, IL (US)

(73) Assignee: Siemens Building Technologies, Inc., Buffalo Grove, IL (US)

( * ) Notice: Subject to any disclaimer, the term of this patent is extended or adjusted under 35 U.S.C. 154(b) by 725 days.

(21) Appl. No.: 09/995,925

(22) Filed: Nov. 28, 2001

(65) Prior Publication Data

US 2003/0100968 A1 May 29, 2003

(51) Int. Cl.
*G01M 1/38* (2006.01)
*G05B 19/42* (2006.01)
*G06F 9/44* (2006.01)

(52) U.S. Cl. .................. 700/276; 700/89; 717/104
(58) Field of Classification Search ............... 716/11, 716/20; 718/102, 106; 717/114; 712/242
See application file for complete search history.

(56) References Cited

U.S. PATENT DOCUMENTS

| | | | | |
|---|---|---|---|---|
| 4,240,137 A | * | 12/1980 | Matsumoto et al. | 712/242 |
| 4,916,642 A | * | 4/1990 | Kaiser et al. | 700/278 |
| 5,311,451 A | * | 5/1994 | Barrett | 700/278 |
| 5,313,615 A | * | 5/1994 | Newman et al. | 716/11 |
| 5,325,526 A | * | 6/1994 | Cameron et al. | 718/102 |
| 6,185,566 B1 | | 2/2001 | Adams et al. | 707/10 |
| 6,192,282 B1 | * | 2/2001 | Smith et al. | 700/19 |
| 6,223,182 B1 | | 4/2001 | Agarwal et al. | 707/102 |
| 6,249,844 B1 | | 6/2001 | Schloss et al. | 711/122 |
| 6,457,021 B1 | | 9/2002 | Berkowitz et al. | 707/201 |
| 6,487,457 B1 | | 11/2002 | Hull et al. | 700/17 |
| 6,523,036 B1 | | 2/2003 | Hickman et al. | 707/10 |
| 6,944,584 B1 | * | 9/2005 | Tenney et al. | 703/22 |
| 2002/0152298 A1 | | 10/2002 | Kikta et al. | 709/223 |

FOREIGN PATENT DOCUMENTS

JP         401057304 A  *  3/1989

OTHER PUBLICATIONS

"Fundamentals of Direct Digital Control Systems", by Jay Santos, Posted on: Sep. 27, 2001, "http://www.energyusernews.com/CDA/Article_Information/Fundamentals._Item/0,2637,64085,00.html".*

* cited by examiner

*Primary Examiner*—Wei Zhen
*Assistant Examiner*—Chih-Ching Chow

(57) ABSTRACT

An apparatus for executing a block program includes a block table listing records corresponding to a plurality of blocks in the block program. A block library is included to hold algorithms associated with the blocks. An executing program selectively processes the blocks in the block program that receive a new input value that is different from a previous input value, in accordance with the associated algorithms in the block library.

18 Claims, 6 Drawing Sheets

APPARATUS AND METHOD FOR EXECUTING BLOCK PROGRAMS

BACKGROUND

The present invention generally relates to block programming, and more particularly to block programming in which the blocks in a program are selectively executed based on changes in the input values of the blocks.

Block programming is well known in the control industry. In contrast to the traditional control programs using sequential language to write lines of codes, block programming is done generally through drawings. For those who are in the control industry, such as building managers or building operations system dealers who install control systems, it is generally more intuitive and easier to draw the control strategies pictorially into blocks that perform various functions, rather than writing it in some programming language such as C or BASIC, for example. These blocks are compiled into a file of records that describe the operations or functions of the blocks, and an interpreter or execution engine interprets the records. Generally, each block in the program represents a subroutine or algorithm that performs various specified tasks. These blocks are connected together through input and output lines or connectors to form a complete program.

Typically, the control systems that employ block programs execute all the blocks within the program each time the program is run. In a block program for operating a heating/ventilation/air conditioning (HVAC) system, for example, there could be from about 1,000 to 2,000 blocks, each of which must be executed every run of the program, which could be every few hundred milliseconds to give the appearance of smooth real-time operation to a human observer. Performing these executions in the required time is not a problem if a relatively fast computer is used. However, such computers are expensive and add to the cost of the control system.

SUMMARY OF THE INVENTION

The present invention is directed to a block programming environment for selectively executing a series of function blocks that make up a program. During each cycle of the program's operation, a determination is made as to whether any input value of each function block has changed, and only those blocks having a changed input are executed. In this manner, a significant economy in programming processing time is realized, thereby allowing use of less powerful and inexpensive processors.

DETAILED DESCRIPTION

Broadly stated, the present invention is directed to an apparatus for executing a block program, and includes a block table listing records corresponding to the blocks in the block program. A block library holds algorithms associated with the blocks, and an executing program process the blocks in the block program in accordance with the associated algorithms. In running the block program, the executing program selectively executes the blocks that receive a new input value which is different from a previous input value.

In accordance with another aspect of the present invention, a method for executing a block program includes creating a table of block records that correspond to a plurality of blocks used in the block program, and creating a library for holding algorithms for executing functions associated with the blocks. The method further includes selectively setting a flag in the block records when at least one input value of the corresponding blocks changes, and then executing the algorithms of the blocks having corresponding block records that have the flag set.

Figure 1:
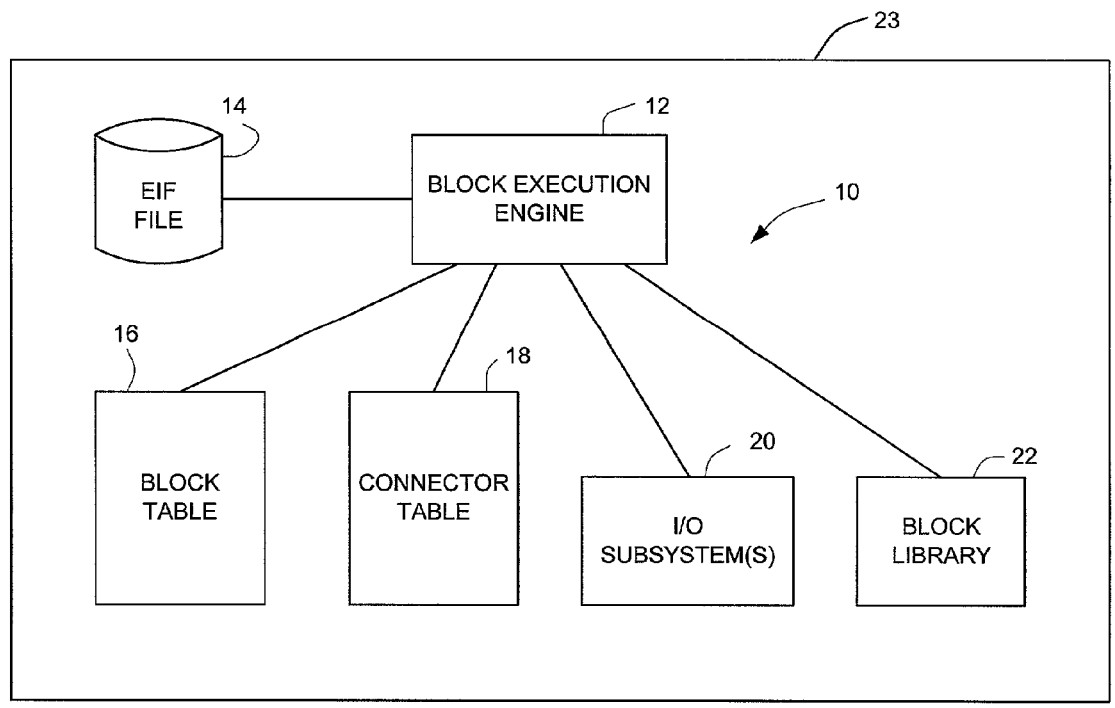
FIG. 1 is a block diagram of a block program execution system in accordance with the present invention.
Figure 2:
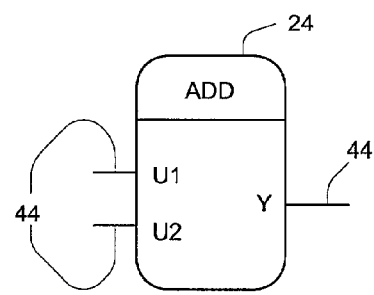
FIG. 2 is an example of a pictorial representation of a mathematical operation block in a block program.

Turning now to FIG. 1, a block program execution system in accordance with the present invention is shown generally at 10, and includes a block execution engine 12 that is operatively connected to an execution image file (EIF) 14, a block table 16, a connector table 18, at least one input/output (I/O) subsystem 20 and a block library 22. The block program execution system 10 is adapted to selectively execute a series of blocks that perform various functions and are arranged and connected in a particular order to make up a block program. The blocks are essentially algorithms for performing various functions, for example, additions, subtractions, PID control, etc. As such, each block includes at least one input and output, as shown in FIG. 2 of a block 24 that performs mathematical additions.

In the preferred embodiment, the block program execution system 10 is implemented in a programmable equipment controller 23 in a control network for controlling, among other things, various end devices such as, for example, fans or actuators in a heating/ventilation/air conditioning (HVAC) system. It should be understood, however, that the present block program execution system 10 may be employed in various other controller devices.

Figure 3:
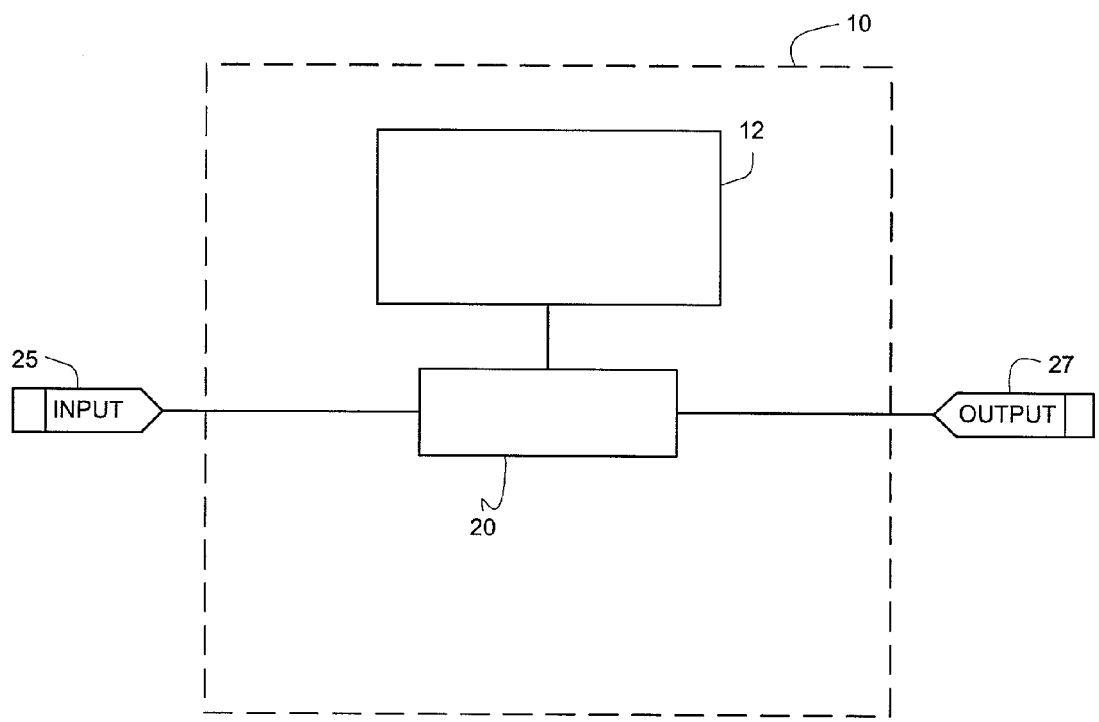
FIG. 3 is a block diagram showing the connection between external input and output blocks and the I/O subsystem shown in FIG. 1.

The block execution engine 12 is a firmware/software program written preferably in C++ object oriented programming language, and is responsible for initializing and executing a block program associated with the block program execution system 10. At the start-up of the system 10, the block execution engine 12 reads the EIF 14, which contains descriptions of the blocks and connectors for operatively connecting the blocks within the block program, and constructs the block table 16 and the connector table 18. As shown in FIG. 3, the I/O subsystem 20 is used to input values into the execution engine 12 from external input blocks 25 (one shown) and to output values to external output blocks 27 (one shown) from the execution engine. In a HVAC system, for example, the external input block 25 might represent a temperature reading from a certain location, and the external output block 27 might represent a signal supplied to an actuator for opening and closing a valve in a hot or cold water pipe. The block library 22 includes a collection of subroutines or algorithms needed to execute the function blocks. For example, the "Add" block 24 shown in FIG. 2 has a corresponding algorithm in the block library 22 for calculating the sum of two input values.

Figure 4:
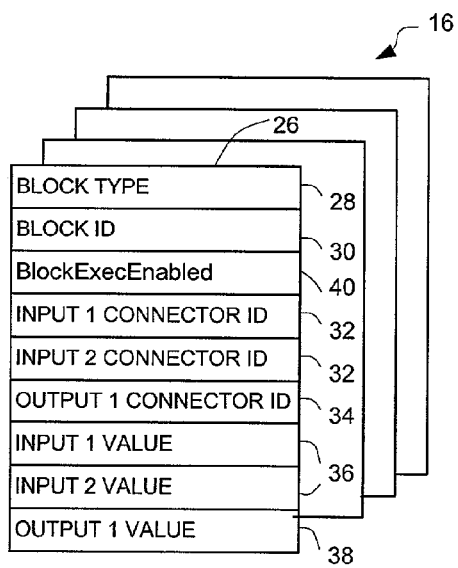
FIG. 4 is a format of a block table shown in FIG. 1.

Turning now to FIG. 4, the block table 16 includes a series of records 26, one record for each block in the block program. The records 26 are sorted in the order of execution of their corresponding blocks in the block program. It should be noted that in the preferred embodiment, the records 26 are already listed in their proper execution order in the EIF 14 even before the block table 16 is constructed.

Each record 26 in the block table 16 provides a block type field 28 for indicating the algorithms that the corresponding block performs, for example, additions, subtractions, PID control, etc. A block ID field 30 provides the block identification number for the block. Input connector ID fields 32 (two shown in FIG. 4) identify each input connector that supplies input values to the block, and output connector ID fields 34 identify the output connectors for carrying output values of the block. Input value fields 36 (two shown) hold values that are input to the block, and output value fields 38 (one shown) hold the output values. It should be noted that the number of input value fields 36 corresponds to the number of input connector ID fields 32, and the output value fields 38 to that of the output connector ID fields 34. Only one value is stored in each of the input and output value fields 36,38. It should also be noted the external input blocks 25 do not have input connectors because the values for these blocks are provided via the I/O subsystem 20. Similarly, external output blocks 27 do not have output connectors because the value is sent to the I/O subsystem 20. Accordingly, the records 26 for the blocks that are operatively connected to the external input or output blocks 25, 27 do have input and output connector ID fields 32, 34 or the input and output value fields 36, 38.

Each record 26 also includes a field 40 ("BlockExecEnabled") for setting a flag indicating whether the block should be executed. This field 40 is set to TRUE to indicate that the block should be executed when at least one of the input values 36 of the block experiences a change, and to FALSE to indicate that the block should not be executed, when no input value of the block has changed.

Figure 5:
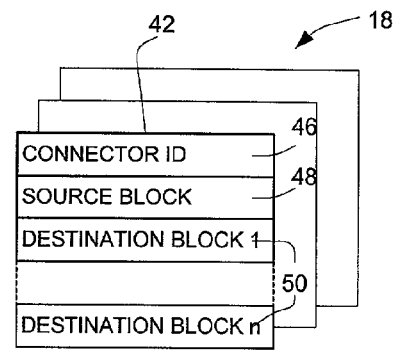
FIG. 5 is a format of a connector table shown in FIG. 1.

Turning now to FIG. 5, the connector table 18 also includes a series of records 42, one each for every connector 44 (best shown in FIG. 2) in the block program for operatively connecting the blocks together. It should be noted that only one connector is connected to a block output and may be connected to one or more inputs of subsequent or destination blocks. Each connector record 42 includes a connector ID field 46 providing an identification number for the corresponding connector in the program. A source block field 48 provides the block identification of the block from which the connector originates, and destination block ID fields 50 identify one or more blocks at which the connector terminates.

Figure 6:
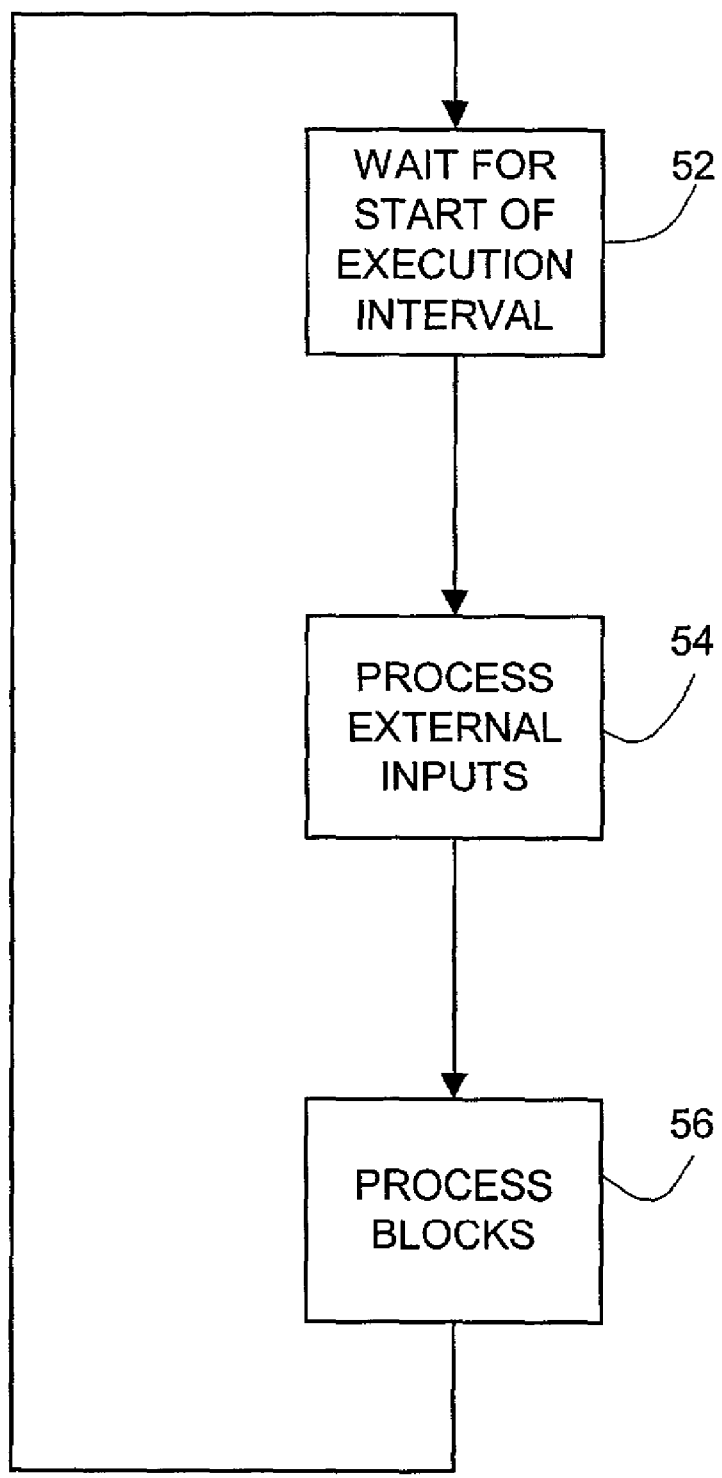
FIG. 6 is a flowchart illustrating the operation of a block execution engine of FIG. 1.

Turning now to FIG. 6, once the block table 16 and the connector table 18 have been established, the block execution engine 12 waits in a suspended state until the start of a new period (step 52), then processes external inputs from the I/O subsystem 20 (step 54), and executes the blocks in the program that are affected by the external inputs (step 56).

Figure 7:
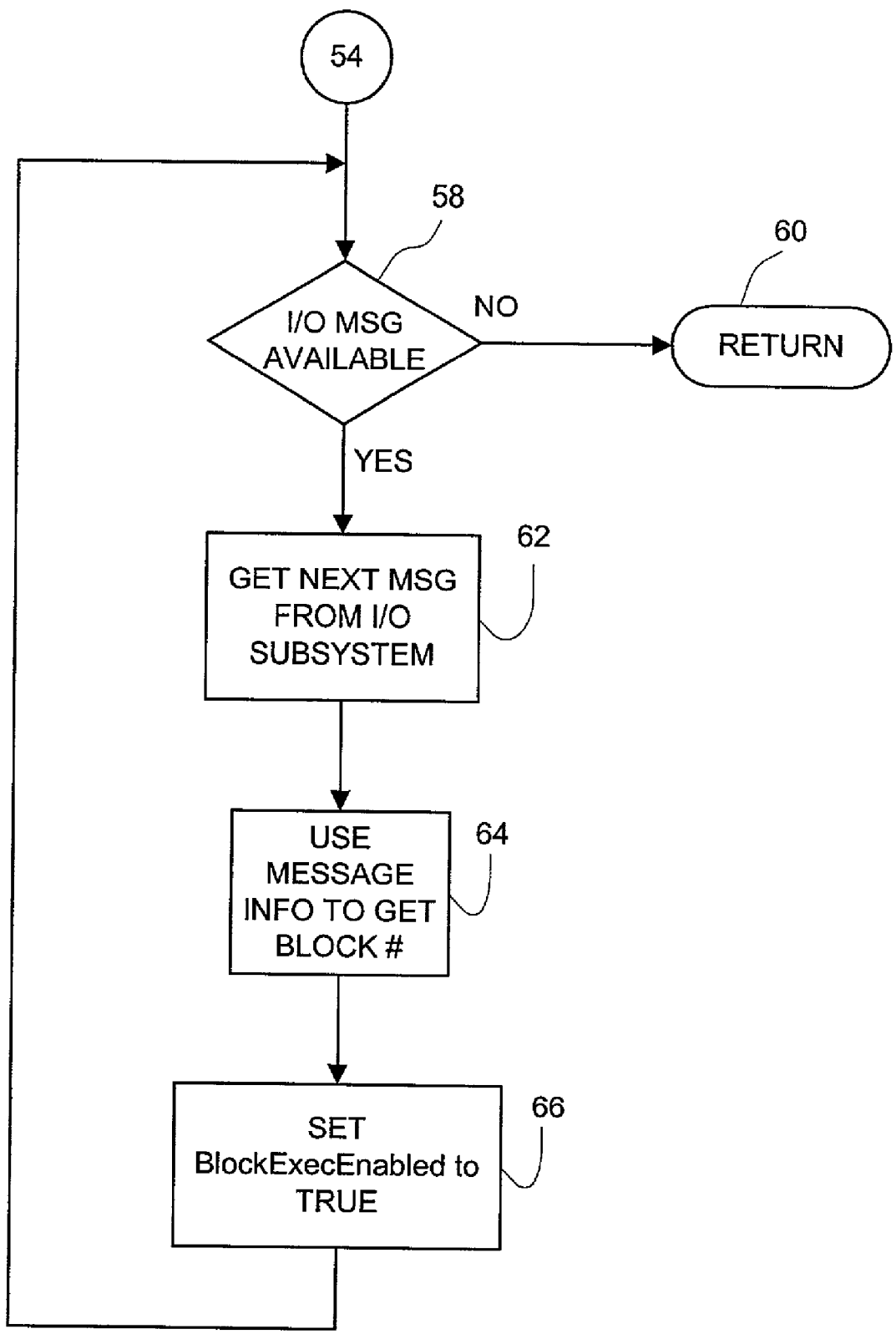
FIG. 7 is a flowchart illustrating the process for executing external inputs by the block execution engine.

More specifically and turning to FIG. 7, the execution engine 12 processes the external inputs from the I/O subsystem 20 by determining whether an I/O message is available in the queue at the start of a new interval (step 58). The block execution engine 12 receives and queues a message from the I/O subsystems 20 if the external input block 25 has experienced a change of input value. If no message is queued, the execution engine 12 waits until the next execution interval to process the messages, if any (step 60). If a message is available, the execution engine 12 fetches the message from the queue (step 62), examines the message to determine which block in the program has experienced a change in its input value (step 64), and sets a flag in the BlockExecEnabled field 40 in the record 26 in the block table 16 to TRUE for the corresponding block (step 66). This sequence is repeated for each message in the queue.

Figure 8:
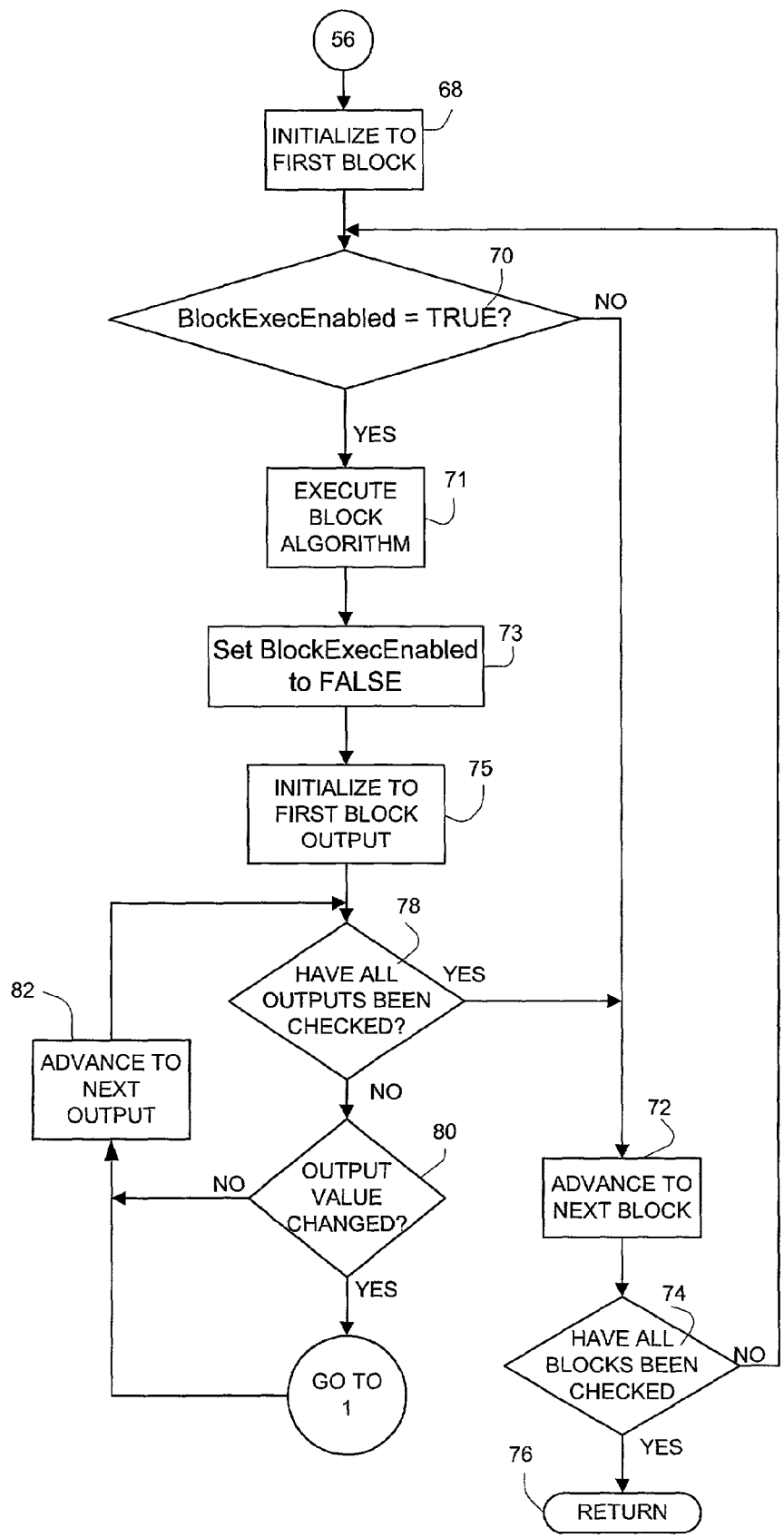
FIG. 8 is a flowchart illustrating the process for executing the blocks; and, FIG. 9 is a flowchart illustrating how changes are propagated through connectors in the block program.

Turning now to FIG. 8, the manner in which the execution engine 12 executes the blocks in the block program is described. The execution engine 12 goes to the first block listed in the block table 16 (step 68), and determines whether the BlockExecEnabled field 40 has been set to TRUE, indicating that at least one input value to the block has experienced a change (step 70). If not, the execution engine 12 advances to the next block 24 on the list (step 72). Then it is determined whether all the blocks 24 have been checked (step 74). The process ends at this point if all the blocks have been checked (step 76). If, however, not all blocks 24 have been checked, then the process goes back up to step 70.

If at step 70, it is determined that the BlockExecEnabled field 40 has been set to TRUE, the execution engine 12 obtains the corresponding algorithm for the block from the block library 22 and executes the algorithm (step 71). After the block has been executed, the BlockExecEnabled field 40 of that block is set to FALSE (step 73). The execution engine 12 then goes to the first output of the executed block (step 75), and determines if all the outputs have been checked to ascertain whether the value of that output has changed as a result of running the algorithm for that block (step 78). If so, the process advances to the next block (step 72).

If all the block outputs have not been checked, then the execution engine 12 determines whether the value of that output has changed (step 80). If not, the execution engine 12 advances to the next output of the same block (step 82), where a determination is again made as to whether all the outputs of that block have been checked (step 78).

Figure 9:
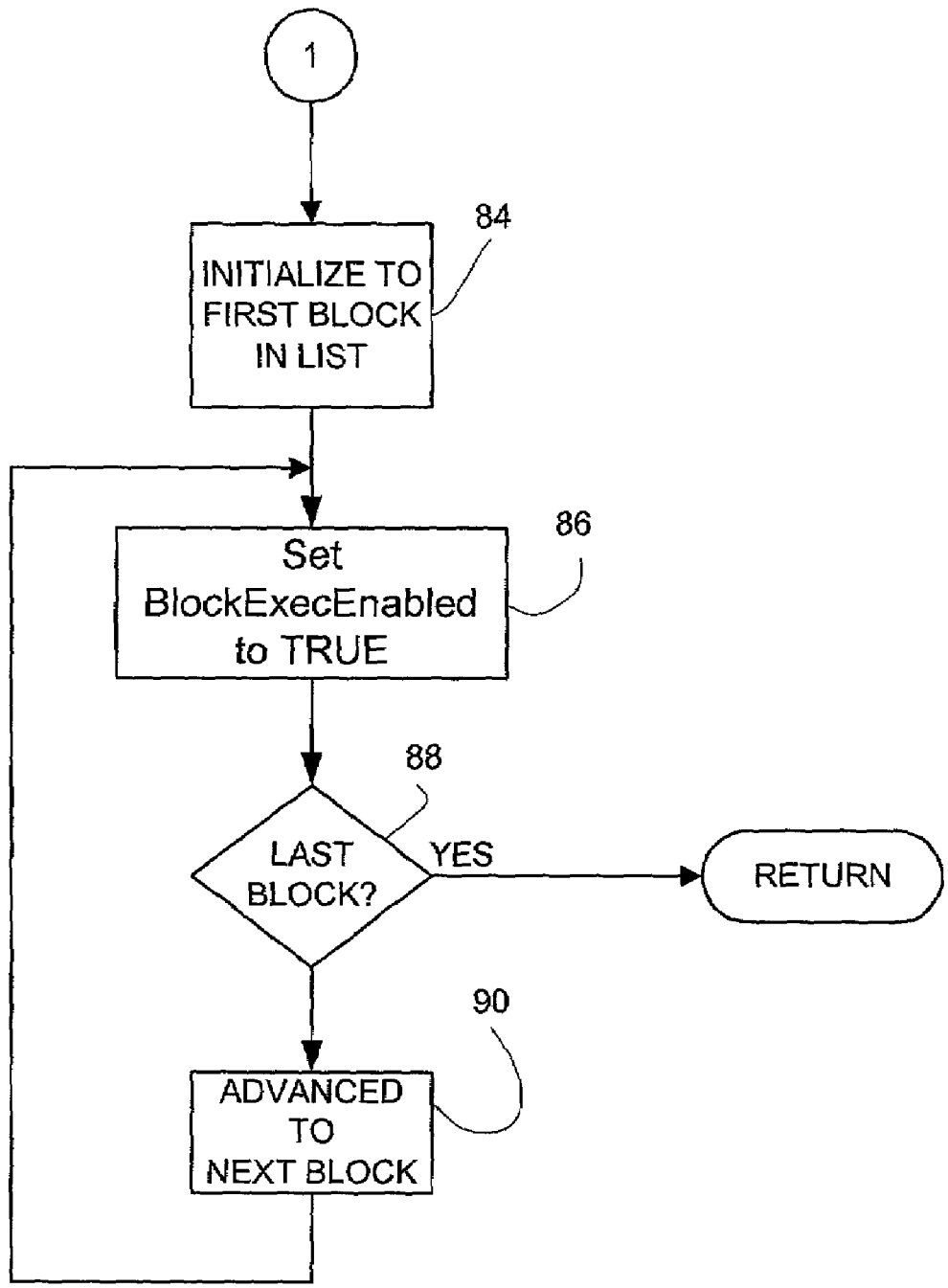

Referring to FIG. 9, if the value of the output has changed at step 80 (shown in FIG. 8), the execution engine 12 goes to the first destination block listed in the record 42 in the connector table 18 corresponding to the executed block (step 84). The execution engine 12 then sets a TRUE flag in the BlockExecEnabled field 40 of the record 26 in the block table 16 corresponding to the first destination block (step 86). Following this operation, it is determined if the current destination block is the last block listed in the connector record 42 (step 88). If not, the execution engine 12 goes to the next destination block listed on the connector record 42 (step 90), where a TRUE flag is set in the BlockExecEnabled field 40 for that destination block (step 86). If at step 88, the previous block in which a TRUE flag was set is the last block, then the process returns to block 82 (see FIG. 8), where the execution engine 12 advances to the next output of the executed block (step 82).

From the foregoing description, it should be understood that an improved system for executing a block program has been shown and described which has many desirable attributes and advantages. The block execution engine goes through each block in the block program in the order that the blocks are arranged and determines whether any input value has changed. In accordance with the present invention, only those blocks that have experienced a change in their respective input values are executed, thereby increasing operating efficiency.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A controller for use in an heating, ventilation and air conditioning (HVAC) system for executing a block program to control at least one device in said system comprising:
   a block table listing a plurality of records corresponding to a plurality of blocks in the block program provided in said controller;
   a block library provided in said controller for holding a plurality of algorithms for executing functions associated with said blocks;
   a block execution engine for executing said blocks in said block program in accordance with said associated algorithms; and
   wherein said block execution engine selectively executes said blocks in the block program only when said block execution engine determines a new input value exists which is different from a previous input value to control said at least one device in said system.

2. The controller as defined in claim 1 further including an execution image file for storing descriptions of said blocks and connections between said blocks.

3. The controller as defined in claim 1 further including means for inputting/outputting data to and from said block execution engine.

4. The controller as defined in claim 1 wherein each of said records in said block table includes a field indicating whether a corresponding one of said blocks is to be executed by said block execution engine.

5. The controller as defined in claim 4 wherein each of said records in said block table further includes,
   a field for indicating the type of function performed by said corresponding one of said blocks; and
   a field for identifying said corresponding one of said blocks.

6. The controller, as defined in claim 5 wherein each of said records in said block table further includes,
   at least one field for identifying at least one output connector connected to said corresponding one of said blocks,
   at least one field for identifying at least one input connector connected to said corresponding one of said blocks,
   at least one field for storing an input value of said corresponding one of said blocks, and
   an output value field for storing an output value of said corresponding one of said blocks.

7. The controller as defined in claim 1 further including a connector table listing a plurality of records of a plurality of connectors for operatively connecting said blocks.

8. The Controller as defined in claim 7 wherein each of said records in said connector table includes a field identifying one of said blocks to which a corresponding connector is connected at a first end, and at least one field for identifying at least one of said blocks to which said corresponding connector is connected at a first end, and at least one second end.

9. A computer-implemented method for executing a block program for controlling at least one device in an heating, ventilation and air conditioning (HVAC) system using a controller, comprising the steps of:
   creating a block table of plurality of block records in the controller that correspond to a plurality of blocks used in the block program;
   creating a library in the controller for holding a plurality of algorithms for executing functions associated with said blocks;
   selectively setting a flag in said block records directly in response to when at least one input value of corresponding said blocks changes; and executing said algorithms of said blocks in said block program having corresponding block records mat have said flag set to control said at least one device in said system.

10. The method as defined in claim 9 further including the step of creating a connector table of records that correspond to connectors for operatively connecting said blocks.

11. Re method as defined in claim 10 further including the step of subsequently setting a flag in said records corresponding to said blocks that are connected to at least one output of said blocks that have been executed, if a value of said at least one output of said executed blocks has changed.

12. The method as defined in claim 11 wherein said step of subsequently setting said flag includes the steps of obtaining an identification of a connector corresponding to said at least one output of said execute blocks from said block records corresponding to said executed blocks, and obtaining an identification of blocks that are connected to said connector.

13. The method as defined in claim 10, wherein said block table and said connector tables are created from an execution image file storing said records for said blocks and said connectors.

14. The method as defined in claim 9 wherein said executing step is performed at every predetermined time interval.

15. The method as defined in claim 9 wherein said records in said block table are listed in an order corresponding to a predetermined order in which said blocks are adapted to be executed in said block program.

16. The method as defined in claim 15 wherein said executing step includes a step of checking each record in said block table in said listed order for said block records having said flag set.

17. A computer-implemented controller for use in an heating, ventilation and air conditioning (HVAC) system having a block program for controlling at least one device in said system, comprising:
   a block table, provided in said controller, listing a plurality of records corresponding to a plurality of function blocks in the block program, said blocks each having at least one input for receiving an input value and at least one output for outputting an output value;
   a connector table listing records of connectors for operatively connecting said blocks;
   a block library for holding algorithms associated with said blocks; and,
   a block execution engine for executing said blocks in said block program in accordance with said associated algorithms;
   wherein said block execution engine selectively executes said blocks in the block program only when said block execution engine determines a new input value is present which is different from a previous input value, wherein at least one device in said system is controlled in response to said block execution engine selectively executing a block.

18. The controller as defined in claim 17 further including means for inputting data to said block execution engine from the devices and the system, and outputting data to me devices and the system from said block execution engine.

* * * * *